UNITED STATES PATENT OFFICE.

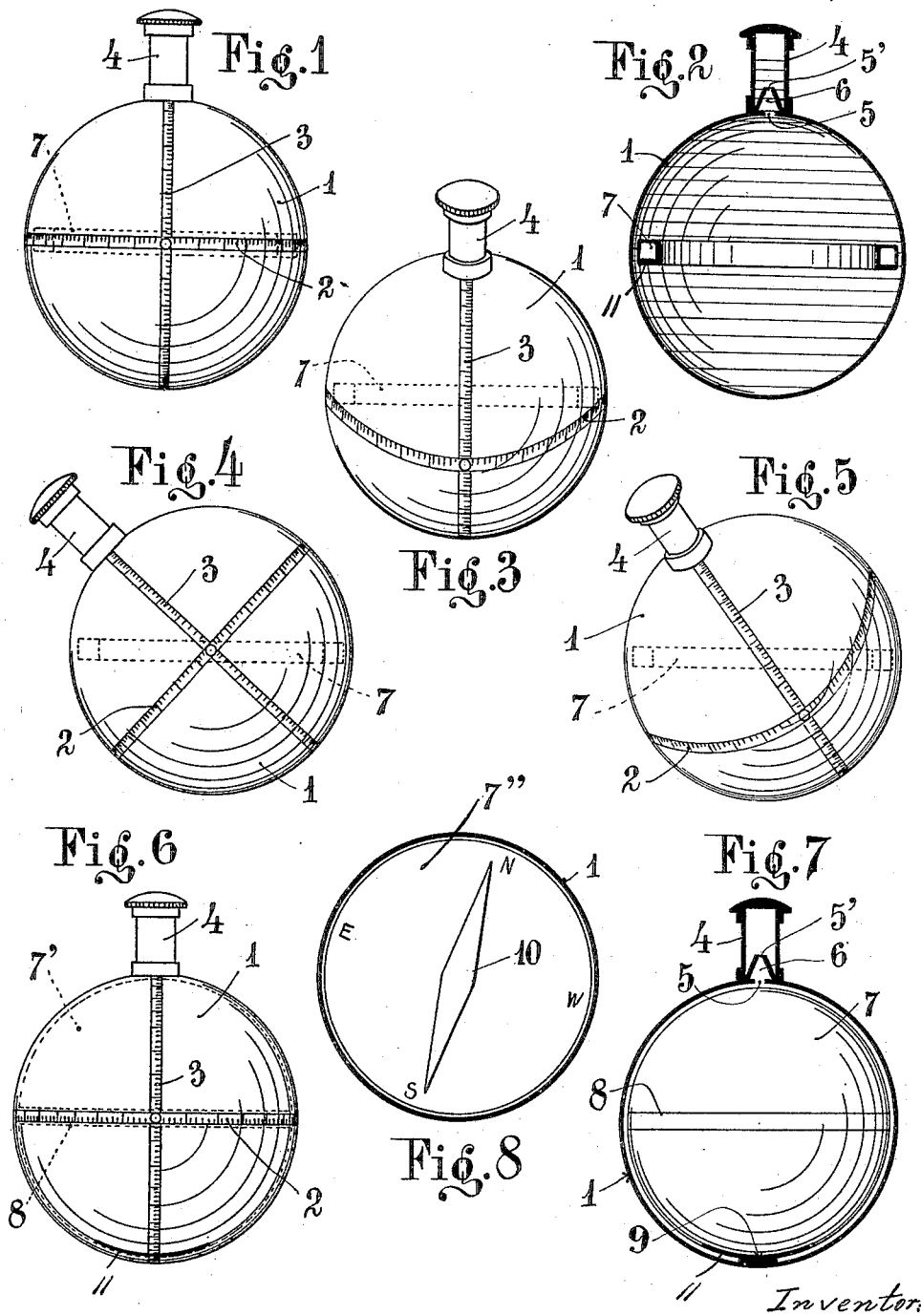

ANTONIO PERADOTTO, OF TURIN, ITALY.

INCLINOMETER.

1,397,490.  Specification of Letters Patent.  Patented Nov. 15, 1921.

Application filed October 18, 1920. Serial No. 417,828.

*To all whom it may concern:*

Be it known that I, ANTONIO PERADOTTO, a subject of the King of Italy, and resident of Turin, Italy, have invented certain new and useful Improvements in Inclinometers (for which I have filed application in Italy, October 4, 1919, application No. 37,353), of which the following is a specification.

This invention relates to instruments for determining the angular position or inclination in any direction of one body with respect to another, and is particularly adapted for use on air craft to indicate the degree of inclination thereof relative to the normal level of the ground; the object of the invention being the provision of an extremely simple and effective instrument of the character stated by means of which the position of the air ship or other body relative to the ground or to some equivalent horizontal surface may be accurately and readily determined.

According to the invention, an indicating element, preferably constituted by a ring, is disposed within a hollow spherical case or receiver constructed either partly or wholly of transparent material and filled with a transparent liquid wherein the ring is submerged. The spherical receiver is suitably attached to the air ship or the like so as to follow its dipping and listing movements and its outer surface is provided with two graduated bands in the form of equatorial circles which are arranged at right angles to each other and are disposed one horizontally and the other vertically for the normal horizontal position of the ship and, hence, of the receiver. The indicating ring is so proportioned as to its weight and ballasted that it has no tendency either to rise or sink and constantly occupies a horizontal position which, in the normal horizontal position of the ship, coincides or is co-planar with the horizontal circular band. The graduations on both bands start from O at the intersection of the bands, so that when the ship inclines in any direction from the horizontal the indicating bands or circles are shifted with relation to the ring, and the angle or angles between the latter and the band or bands may be easily read and will give the precise inclination of the ship.

The invention further resides in the provision of improved means which allow the liquid contained in the transparent spherical receiver to expand and contract freely, due to temperature variations, but which prevent the entrance of air into the receiver during contraction of the liquid; such means preferably comprising a sealed neck or extension on the receiver within which there is disposed a conical nipple apertured at opposite ends for communication with the interior of the neck and with the receiver. The dimensions of the neck and of the conical nipple are so proportioned and the receiver is filled to such an extent that when the liquid is contracted to the maximum degree its level will still be above the opening at the apex of the nipple, while under a maximum expansion condition an air space will be left within the said neck between the wall of the latter and the conical nipple wall.

Means may also be provided for enabling the utilization of the indicating element to determine the direction in which the air ship is traveling—in other words, the relation of the longitudinal axis of the ship to the north; and for this purpose, the aforesaid indicating element may be equipped with a magnetic needle or the like, so that the instrument can thus be employed as a compass.

An embodiment of the invention is illustrated in the accompanying drawing, whereof:

Figure 1 is a front view of the instrument in normal position;

Fig. 2 is a diagrammatic central vertical section;

Figs. 3, 4 and 5 are views generally similar to Fig. 1, but showing the instrument in different inclined positions;

Figs. 6 and 7 are respectively, a front view and a central vertical section of a slightly modified construction;

Fig. 8 is a horizontal sectional view of a form of construction in which the instrument is adapted for use as a compass.

Referring more particularly to the drawing, the improved instrument comprises a spherical case or body 1 adapted to be secured in some suitable manner to the frame of the air ship or other body whose inclinations are to be measured; the outer surface of the sphere being provided with two graduated bands 2 and 3, here shown as in the form of equatorial or great circles of the sphere arranged at right angles to each other, one of such bands being normally disposed horizontally and the other one vertically. The sphere 1 may be made either wholly or partly of transparent material, and is designed to contain a transparent, non-freezing liquid in which, in turn, the indicating element hereinafter described is submerged, said element coacting with the graduated bands or scales 2 and 3 to indicate the degree of inclination or angular displacement of the sphere. The latter is filled with this liquid, which is allowed to freely expand and contract under temperature changes; provision being made, however, for preventing the entrance of air into the interior of the spherical receiver when the liquid contracts.

For this purpose, the spherical receiver has secured to its upper portion, directly in line with its vertical axis, an upstanding extension or neck 4 which is sealed at its top, as shown, and contains in its lower portion a conical nipple 6. The nipple is provided at its base with an opening 5' for communication with the interior of the sphere, and its apex is similarly formed with an opening 5, for communication with the interior of the neck; the relative dimensions of the nipple and the neck being so proportioned that when the liquid filling the sphere is fully contracted, its level is above the apex of the nipple, and when the liquid is fully expanded, an air space is left within the neck. Under these conditions, the receiver will be filled at all times with the liquid, and even when it is completely inverted, air is prevented from entering the sphere but will collect in the space between the wall of the neck and that of the conical nipple.

The above-mentioned indicating element is disposed within the sphere 1 and, in its preferred form, as illustrated in Figs. 1 to 5, it consists of a hollow ring 7, ballasted by a bottom ring 11 so that the ring will remain constantly submerged in horizontal position in the liquid and will have no tendency to either rise or sink. The extent of submergence is such, in the present instance, that in the normal position of the sphere the ring and the horizontal indicating band 2 occupy a common plane, from which plane the said band is tilted in one direction or the other according as the ship dips at bow or stern; and in practice it is advisable to make the height of the ring somewhat greater than that of the band so that the edges of the former will project above and below those of the latter when the said ring and band occupy their co-planar horizontal position (Fig. 1).

It will be apparent, therefore, that whenever the ship dips down at bow or stern, its angle of inclination and, hence, its angular position relative to he ground, can be readily determined by reading on the vertical band 3 the measurement of the angle formed between the ring and the horizontal band, as indicated in Fig. 3. Similarly, if the ship lists to either side, the parts will be displaced in the manner indicated in Fig. 4 and, if the ship lists and dips, displacement will take place as represented in Fig. 5, in either of which cases the readings can easily be made.

In the modified construction illustrated in Figs. 6 and 7, the annular indicating element 7 is replaced by a hollow sphere 7' preferably made of sheet metal and having a ballast 11, and sphere having a horizontal indicating band 8 in the form of a great circle marked on its outer surface for coöperation with the bands 2 and 3; the band 8 being given the same height as the aforesaid ring 7 and for precisely the same purpose. In this form of the invention, the outer sphere or case 1 also contains a small quantity of mercury or other relatively heavy liquid, indicated at 9 in Fig. 7, which is non-miscible with the transparent filling liquid but collects in the bottom of the case and serves as an anti-friction support for the inner sphere 7' should the latter have any tendency to sink because of the reduction in the density of the liquid due to its expansion under an increase of temperature. The operation or mode of use is the same as in the first form, as will be obvious.

In the further modification illustrated in Fig. 8, a hemi-spherical ballasted indicating element 7'' is employed, which occupies the lower half of the receiver, the band 8 being arranged along the upper edge of said element or member. Since the indicating element is held in a given direction in the horizontal plane by the magnet embodied in it, the band 8 may be graduated for coöperation with the band 2 for showing the inclination of the magnet with regard to the casing in a horizontal plane. The operation is the same as with the construction shown in Figs. 6 and 7, and requires no separate description or explanation. Any of the indicating elements above described may be provided with magnetic devices for constantly holding them in a predetermined position with relation to the north, thereby permitting the instrument to be utilized as a compass for ascertaining the position of the longitudinal axis of the ship relative to the north. One such device is illustrated in connection with the structure shown in Fig. 8, where it is represented as comprising a magnetic needle 10 applied to the sphere 7''.

The invention, considered as a whole, thus provides an instrument of rigid construction which is not apt to be affected by the shocks and vibrations usually occurring during the flight of an air ship, and the indicating element of which is free to move in any direction, so that the inclination of the ship can be readily and accurately determined at any time. Furthermore, the instrument may be utilized as a compass and, therefore, will give all of the indications necessary for the control of the ship, with the advantage that the readings are made in a vertical plane and, hence, under the most satisfactory conditions for the observer.

I claim as my invention:—

1. An inclinometer, comprising a transparent hollow globe having indicia visible on its outer surface; a neck rigidly secured to said globe and sealed at its outer end; a conical nipple in the inner end of said neck having openings in its apex and base communicating, respectively, with the interior of the neck and the interior of the globe; a transparent, expansible and contractible liquid filling said globe and extending into said nipple; and an indicating element for coöperation with said indicia suspended in the liquid in said globe.

2. An inclinometer, comprising a transparent hollow globe having two graduated indicating bands visible on its outer surface, said bands being in the form of equatorial circles of the globe intersecting each other at right angles and disposed one horizontally and the other vertically when the globe occupies its normal position; a transparent liquid in said globe; and an indicating element having a weight which is so proportioned as to maintain it constantly suspended in horizontal position in said liquid having a well-defined annular surface for coöperation with said indicating bands, said element being disposed co-planar with the horizontal band in the normal position of the globe.

3. An inclinometer, comprising a transparent hollow globe having indicia visible on its outer surface; a transparent liquid in said globe; an indicating element suspended in said liquid for coöperation with said indicia and a device connected with said indicating element for maintaining it constantly in predetermined position with relation to the magnetic north.

4. An inclinometer, comprising a transparent hollow globe having indicia visible on its outer surface; a transparent liquid in said globe; an indicating element suspended in said liquid and having a well-defined annular surface for coöperation with said indicia; and a device connected with said indicating element for maintaining it constantly in predetermined position with relation to the magnetic north.

5. An inclinometer, comprising a transparent hollow globe having indicia visible on its outer surface a transparent liquid in said globe; and an indicating ring the weight of which is so proportioned as to hold it in a constant, predetermined submerged position in said liquid to enable it to coöperate with said indicia.

6. An inclinometer, comprising a transparent hollow globe having two graduated indicating bands visible on its outer surface, said bands being in the form of equatorial circles of the globe intersecting each other at right angles and disposed one horizontally and the other vertically when the globe occupies its normal position; a transparent liquid in said globe; and an indicating ring for coöperation with said indicia having a weight which is so proportioned as to maintain the ring in a constant, submerged horizontal position in said liquid, the plane occupied by said ring substantially coinciding with that of the horizontal band when the globe is in normal position.

Signed at Turin, Italy, this 24 day of Sept., 1920.

ANTONIO PERADOTTO.